United States Patent [19]

Clarke

[11] Patent Number: 4,795,207
[45] Date of Patent: Jan. 3, 1989

[54] VEHICLE COVER

[75] Inventor: Edwin B. Clarke, Bala Cynwyd, Pa.
[73] Assignee: Budge Manufacturing Co., Inc., N.J.
[21] Appl. No.: 76,758
[22] Filed: Jul. 23, 1987
[51] Int. Cl.⁴ ............................................. B62D 25/00
[52] U.S. Cl. ................................... 296/136; 150/52 K
[58] Field of Search ....................... 296/136; 150/52 K

[56] References Cited

U.S. PATENT DOCUMENTS

| | | | |
|---|---|---|---|
| 2,243,981 | 6/1941 | Rowan | 150/52 K |
| 2,688,513 | 9/1954 | Poirier | 296/136 |
| 2,733,747 | 2/1956 | Altschul | 150/52 K |
| 4,294,483 | 10/1981 | Ferris | 296/136 |
| 4,612,967 | 9/1986 | Kamen et al. | 296/136 |

*Primary Examiner*—Robert R. Song
*Attorney, Agent, or Firm*—Eugene E. Renz, Jr.

[57] ABSTRACT

A vehicle cover useful for small trucks such as pickups and vans, comprising a central panel having a width of about the width of the vehicle and a length slightly longer than the side elevational profile taken along the front, top and back of the vehicle; a pair of side panels having a shape generally corresponding to the side elevational profile of said vehicle; the side panels being attached to the central panel along the length thereof to form junction seams which define a pair of parallel vertical planes spaced apart by the width of the vehicle; and an elastic band member having a relaxed state slightly less than the rectangle defined by the length and width of the vehicle, the band being circumscribed by the lower terminal edge of the panels.

1 Claim, 3 Drawing Sheets

VEHICLE COVER

FIELD OF THE INVENTION

This invention relates to a vehicle cover useful for small trucks such as pickups and vans.

BACKGROUND OF THE INVENTION

Automobile manufacturers have developed a variety of specialized vehicles in response to demands by consumers. One class of these vehicles are the small trucks such as pickups and vans which are oftentimes purchased as second or even third vehicles. These vehicles are particularly suitable for their dual intended purposes which is carrying both passengers and cargo. The more expensive versions of these vehicles are quite finely appointed and have attractive appearances.

Since many of these vehicles are second or third vehicles, or have been purchased by young people who have not yet acquired a traditional home and, therefore, a garage for storing the vehicle, these vehicles are regularly parked outside without protection from the environment. As attractive as these vehicles are in their original showroom luster, the effects of sun, wind, rain, and snow rapidly diminishes the appearance of the vehicle if they are not regularly parked in a garage or other covered area. Exposed vehicles are also the target of bird droppings which diminish the luster of the vehicle finish. Many times the owners of these vehicles do not have access to a garage or their more expensive vehicles are already occupying what garage space is available. In any event, it often is necessary for vehicles such as pickups and vans to be parked outside in all weather.

The use of a protective cover to prevent environmental damage to parked vehicles is, of course, one alternative for protecting a vehicle. However, ordinary vehicle covers which might be suitable for use on sports cars or other small passenger vehicles have been found to be unacceptable for use on trucks such as pickups and vans. Both of these latter-type vehicles have a significant vertical height as compared to sports cars and other smaller vehicles. Accordingly, what conveniently fits a small car will not accommodate a van or pickup truck. If the design for the cover is enlarged so as to accommodate the vertical height of the truck, the balloon-like state of a sprawling tent-like nature makes it difficult to install. In addition, in any kind of moderate wind, the generally rounded shape of conventional car covers can cause expensive and unsightly damage to the finish on a vehicle as it is allowed to flap in the wind. Complicated tie-downs and crosspieces are ineffective, as instructions are lost or the straps and fastening mechanisms are lost or misplaced.

Large undefined vehicle covers also are difficult to install, particularly by an individual alone since there is no form or structure to the cover and it does not include any means effecting an adequate alignment of the cover during its installation.

Another drawback for vehicle covers which are merely enlarged versions of those used on sports cars and other personal vehicles is that they employ a large amount of material in order to accommodate the relatively high vertical height of the vehicle resulting in a product which is both difficult to handle and difficult to store in a convenient and small space. Since it is not possible to adhere the conventional cover to the profile of a small pickup or van, even with some form of lock or security system, access to the vehicle is possible without removing the cover.

Accordingly, it is an object of this invention to provide a vehicle cover for small trucks which accommodates the high vertical heights of these vehicles.

Another object of this invention is to provide a cover which is esily installed by one person and which can be centered about the vehicle so as to permit quick, safe and effective covering of the vehicle.

A further object of the present invention is to provide a car cover which snugly fits the vehicle and may be fabricated from a blank of material having very simple geometric shapes and thereby minimizing the amount of material necessary to make the cover and is characterized by relatively few seams, both contributing greatly to economy of manufacture.

A further object is to provide a cover having seams which align generally with profile edges of a vehicle and snugly embraces the vehicle so that it is aesthetically pleasing.

SUMMARY OF THE INVENTION

It has now been discovered that the above and other objects of the present invention may be accomplished in the following manner. Specifically, the present invention includes a vehicle cover useful for small pickups and vans which is easy to install and which is readily aligned on the vehicle.

The vehicle cover of this invention includes a central panel which has a width of about the width of the vehicle and has a length which is slightly longer than a plan profile taken along the front, top and back of the vehicle. In a preferred embodiment, the length is measured from just slightly behind the front bumper to just slightly in front of the back bumper.

Also forming a part of the present invention are a pair of side panels which have a shape generally corresponding to the side elevational profile of the vehicle excluding, of course, the wheels. The side panels are attached to the central panel along the length thereof to form junction seams. These junction seams run up the front of the vehicle along the side elevational profile access the top and down the back of the vehicle. These junction seams define a pair of parallel, vertical planes spaced apart from each other by the width of the vehicle. These pair of parallel, vertical planes correspond to the planes of the sides of the vehicle and provide for accurate and easy centering of the cover.

Finally, an elastic band member is circumscribed by the lower terminal edge of the panels so that the cover is held under the bumpers and rocker panels. The elastic band member has a relaxed state which is slightly less than the rectangle defined by the length and width of the vehicle, so that the vehicle cover will be held in place under normal conditions.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENTS

Figure 1:
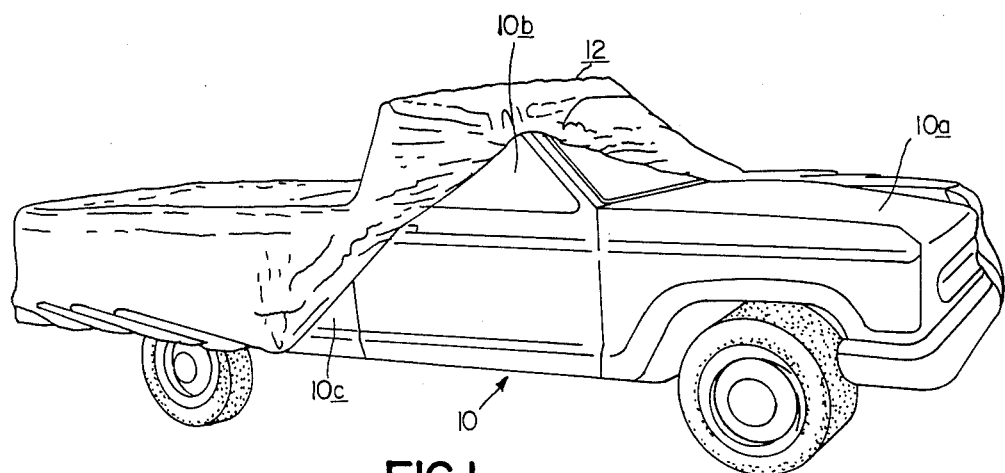
FIG. 1 is a perspective view of a typical truck having its body portion partially enshrouded with a protective device of this invention.
Figure 3:
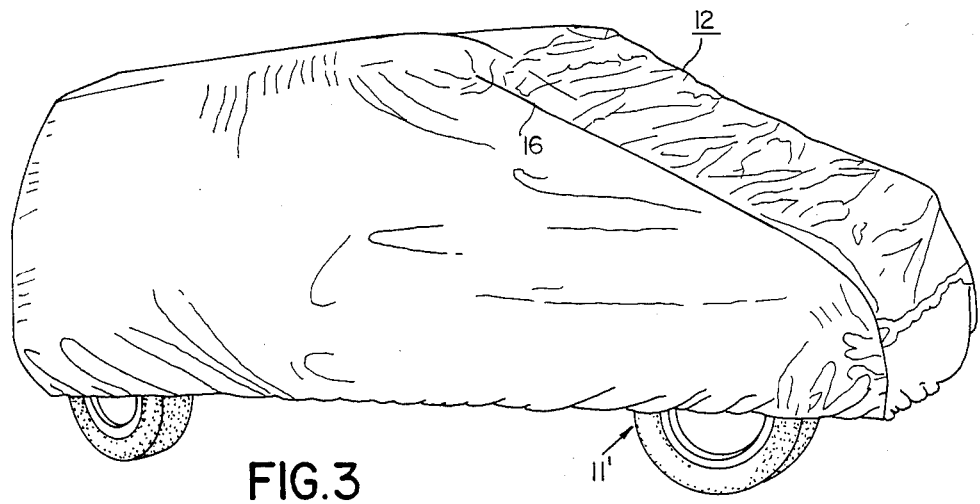
FIG. 3 is a perspective view of a typical van having its body portion completed enshrouded with a protective device of this invention.

As shown in FIG. 1, a small pickup truck 10 is shown having its body portion partially enshrouded with a protective cover 12 according to the present invention. The pick up comprises a front hood section 10a, a central cab section 10b and a rear cargo compartment section 10c. The plan profile of the top is generally rectangular. The side profile is likewise an elongated generally rectangular shape with the cab projection profile being generally trapezoidal. As can be seen, the side of the cover fits nicely under the bumpers and the sides of the vehicle. The seams of the cover 12 run along the side elevational profile of the vehicle, as will be described hereinbelow. In FIG. 3, a cover 12 is shown fully enshrouding a van. In this view, the seam is more visible and it can be seen that the seam 16 is on the passenger's side and is in a vertical plane. There is an equal parallel, vertical plane on the driver's side of the vehicle, spaced from seam 16 and the plane it defines by a distance approximately equal to the width of the vehicle 11.

Figure 2:
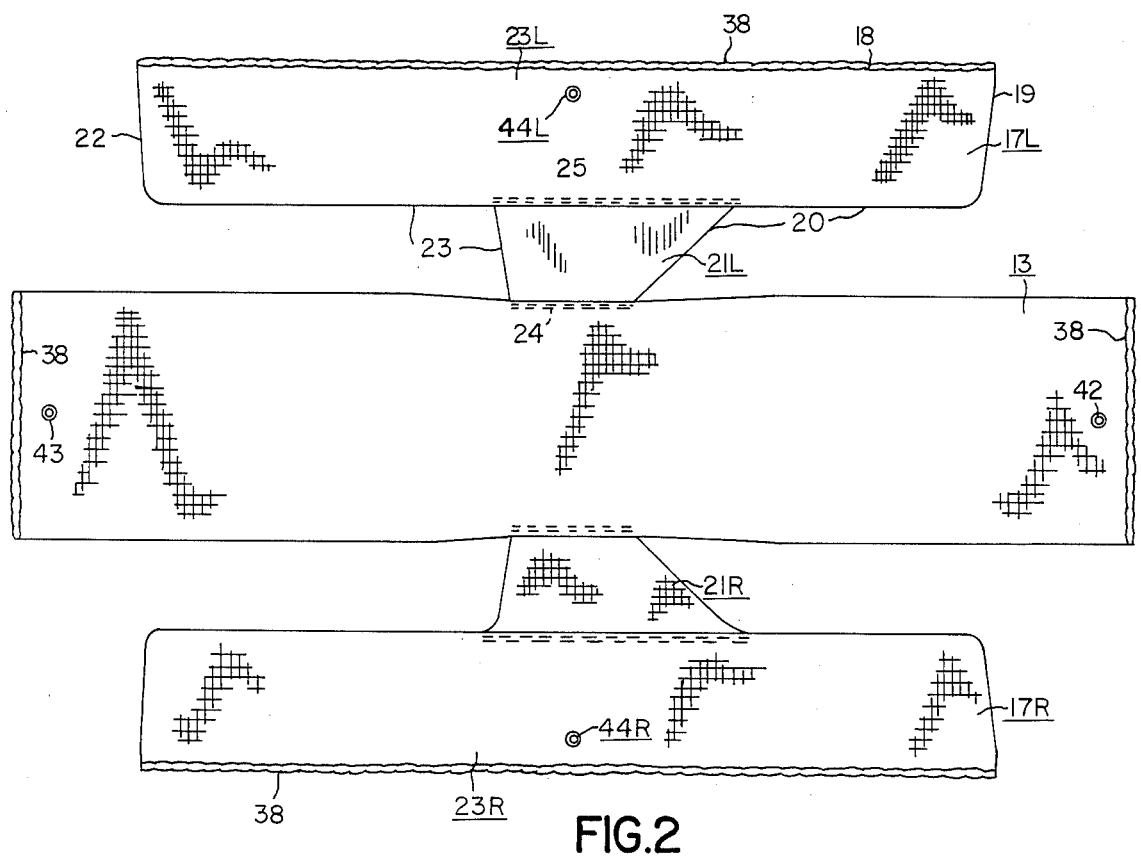
FIG. 2 is a development of the cover of this invention, prior to assembly.

The cover of the present invention may be fabricated from a blank of the configuration illustrated in FIG. 2. This blank includes a central panel 13 of generally rectangular shape and left and right side panels 17L and 17R which are mirror images of one another secured by stitches for example, two opposite side edges of the central panel at approximately the midpoint region thereof. The side panel 17L and 17R are of a configuration generally similar to the side elevational profile of the truck 10 and thus include a cab panel section 21L and 21R and an elongated generally rectangular body section 23L and 23R.

As shown in FIG. 2, the cover of the present invention includes a central panel 13 which has a width 14 approximately equal to the width of the vehicle which it is intended to cover. The central panel is generally rectangular in shape and has a length which is slightly longer than the side elevational profile of the vehicle taken along the front top and back of the vehicle. The length 15 of panel 13 does not include the bottom of the vehicle in the side elevational profile since the purpose of this panel is to cover the front, top and back of the truck.

Attached to the central panel 13 are a pair of side panels 17L and 17R. These side panels 17L and 17R are generally conformed to the side elevational profile of the vehicle. The side panel 17L has a bottom portion 18 which is slightly longer than the length of the vehicle 10. It has a front portion 19 and an upper front portion 20. The side panel 17L has a back portion 22 and an upper back portion 23. In addition to being attached to central panel 13 at the seam 24, the side panel 17L is attached to the length of the central panel 13 at all of the portions of the side panel that correspond to the side elevational profile of the vehicle 19, 20, 22 and 23 which is taken along the front, top and back of the vehicle. Similarly, the other side panel 17R is attached to central panel 13.

The junction between the central panel 13 and the side panels 17L and 17R provide junction seams along the length 15 of central panel 13 and along portions 19, 20, 22, 23 and 24 of side panel 17L, for example. The junction which may be double-sewn or otherwise securely made to attach these two panels 13 and 17L, defines a vertical plane which corresponds substantially to the plane defined by the side elevational profile of the vehicle. Clearly, it is seen that there are a pair of vertical planes spaced apart from one another by the width of the vehicle, each plane being defined by the junction seams between the central panel 13 and the side panels 17L or 17R.

The advantage of such a seam defining pair of parallel, vertical plane is that the cover can easily be placed on the vehicle by one person who can center the cover without inadvertently having entirely too much or too little of the cover on one side.

In a preferred embodiment, when pickup trucks are employed, an additional seam 25 may be necessary to attach a portion of the side panel 17L to accommodate the projection of the cab above the rest of the vehicle. Seam 25 permits a more economical use of starting fabric, since the cutting can be accomplished with substantially less wasted material. Nevertheless, seam 25 is also in the plane defined by the side elevational profile, as are seams 19, 20, 22, 23 and 24.

Figure 6:
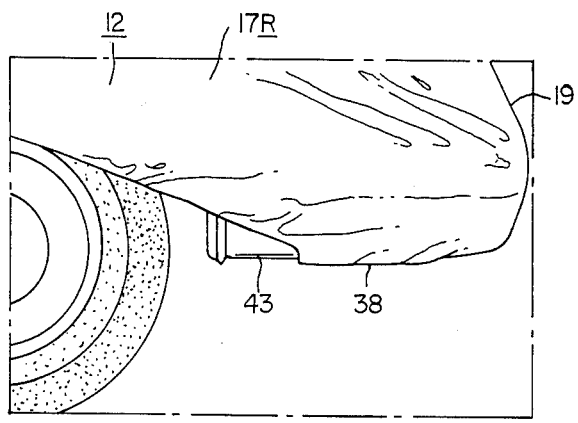
FIG. 6 illustrates a further detail showing the secure fitting of the device under the front or rear bumper.
Figure 7:
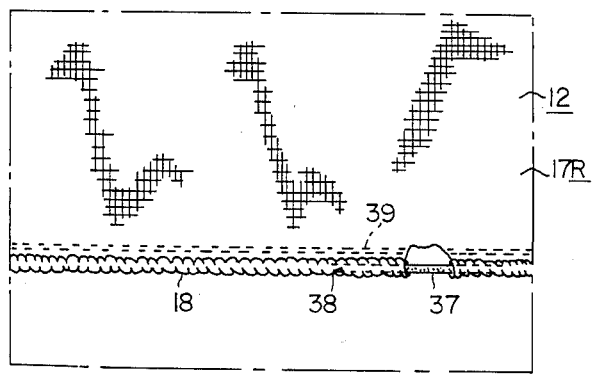
FIG. 7 is a fragmentary perspective view of the enshrouding fabric of this invention, illustrating the elastic terminal edges thereof.

As is more clearly seen in FIG. 7, the bottom portion 18 of side panel 17L or 17R includes an elastic band member 37 and is circumscribed by the lower terminal edge 38 of the fabric 12. Seam 39, again double-stitched for safety and security, encloses the elastic band 37. The elastic band member is sized to have a relaxed state which is slightly less than the rectangle defined by the length and width of the vehicle. This allows the band to pull the fabric under the vehicle, as shown in FIG. 6, for example, the panel 17L is pulled under the vehicle so that the folded-over band 48 is under a bumper 43.

Figure 4:
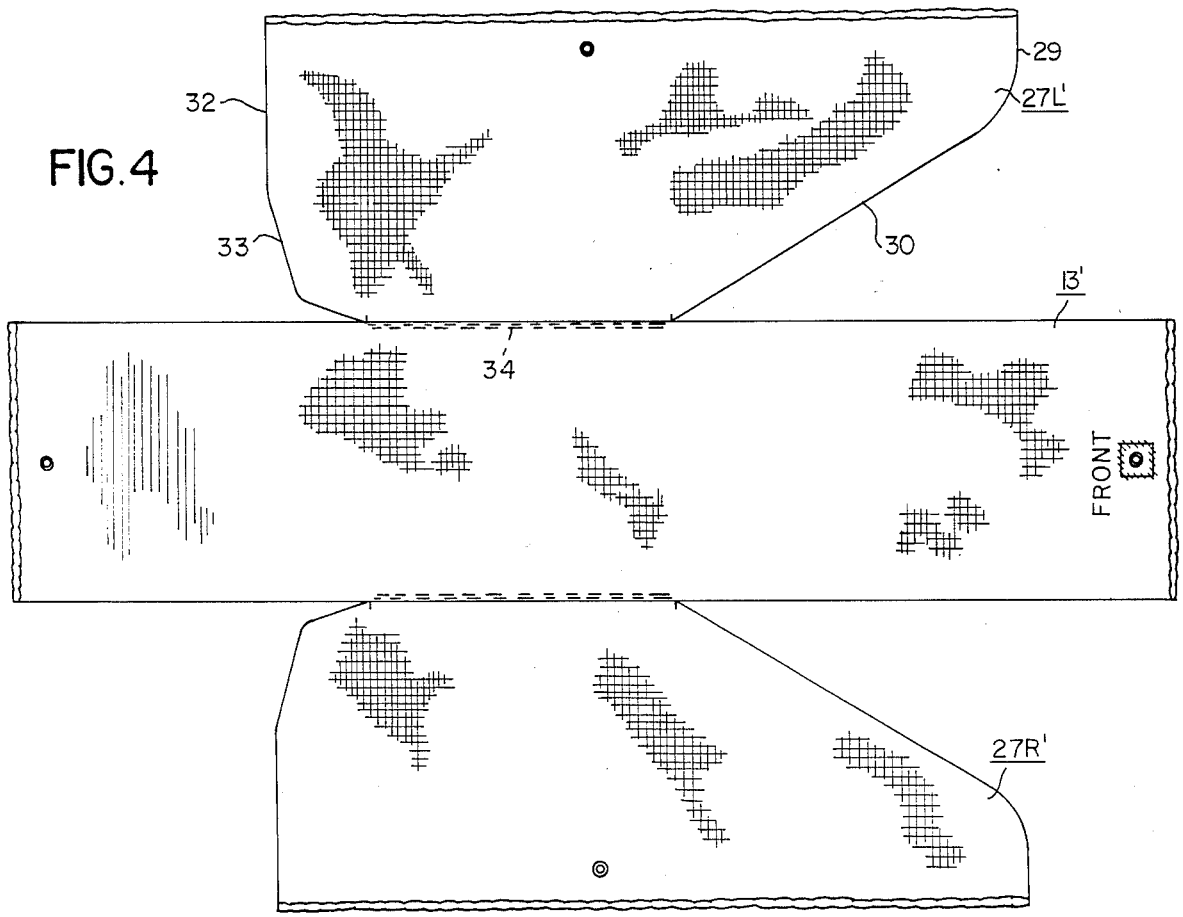
FIG. 4 is a development of the cover of this invention shown in FIG. 3, prior to assembly.

As shown in FIG. 4, the design is basically the same for a van as it is for a pickup truck. Central panel 13 has a width 14 which is about the width of the van 11. The length 15 is slightly longer than the side elevational profile taken along the front, top and back of the van 11. Side panels 27L and 27R are joined along the length 15 to the central panel 13. The side panel 27L has a length 28 which is slightly longer than the van 11. The general shape of side panels 27L and 27R is that of the side elevational profile of van 11. The front portion 29 and upper front portion 30 of side panel 27L along with the back portion 32 and upper back portion 33 are joined to the length 15 of central panel 13 in addition to the junction at seam 34. When all of the seams 29, 30, 32, 33, and 34 of side panel 27L are joined to central panel 13 along length 15, junction seams are formed which define a vertical plane which corresponds generally to the side elevational profile of the vehicle. Clearly there are two parallel, vertical planes spaced apart by the width of the vehicle and formed by the junction of central panel 13 with the two side panels 27L and 27R.

In order to install the vehicle cover of the present invention, one merely needs to place it over the vehicle, unroll it so that the seams between the central panel and the side panels are generally parallel to the side elevational profile of the vehicle so that the cover will self-center on the truck or van.

One preferred method for folding the vehicle cover of the present invention so that it can be easily stored and quickly put to use when needed includes folding the cover 12 from both ends, corresponding to the front and back of the vehicle, in approximately 12" folds until the two sets of folds reach the center. At this point, fold the cover three times at the center of the truck. This procedure allows rapid and convenient use of the cover. Specifically, after the cover has been taken from storage, whether in the vehicle or in another secure place, one person can easily toss the lightweight fabric onto the top of the truck, allowing the cover to unfold at the place where it has been folded in thirds. Standing on one side of the vehicle, the operator aligns the seam which is clearly visible with the edge of the vehicle and begins to unfold in either direction toward the front or rear of the truck. By keeping the seam aligned with the edge of the vehicle, the cover is automatically centered. After the cover has been unfolded, the individual can begin to place the terminal ends of the cover under the bumper and rocker panels and side portions of the vehicle.

When severe, inclement weather is expected, it is possible to further secure the cover on the vehicle by passing a rope from grommet 42 under the vehicle and tying it to grommet 43 as shown in FIG. 2. Similarly, bottom grommet 44L can be connected to grommet 44R with a small length of rope.

Figure 5:
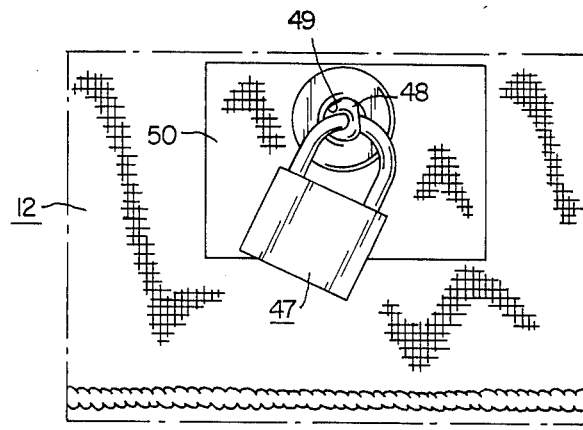
FIG. 5 illustrates an additional detail for securing the cover to the vehicle.

As shown in FIG. 5, an optional security system can be installed. Specifically, a lock 47 can be attached to a cable 48 or other part of the vehicle extending through the port 49 which is sewn into the cover 12 with a reinforcing area 50. This lock means prevents the removal of the cover 12 from the vehicle because the portal 49 is too small to permit passage of the padlock 47 therethrough.

While particular embodiments of the present invention have been illustrated and described herein, it is not intended to limit the invention and changes and modifications may be made therein within the scope of the following claims.

What is claimed is:

1. A vehicle cover useful for a pickup truck comprising:
   a central rectangular panel having a width of about the width of said truck and a length slightly longer than the side elevational profile taken along the front, top and back of the truck;
   a pair of side panels each formed from a lower rectangular panel and an upper trapazoidal panel and attached to one another by double stitching to provide a shape generally corresponding to the side elevational profile of said truck;
   said side panels being attached to said central panel by double stitching along the length thereof to form junction seams which define a pair of parallel vertical planes spaced apart by the width of said truck; and
   an elastic band member having a relaxed state slightly less than the rectangle defined by the length and width of said truck, said band being circumscribed by the entire lower terminal edge of said panels,
   grommet means at at least two opposing terminal bottom ends of said cover to permit rope means to be attached to secure the cover in severe inclement weather; and
   a lock portal having a reinforced opening to permit a portion of the truck to extend through the cover, said portal being sized to permit a lock to be attached to the portion of the truck extending through the portal to prevent said cover from being removed from the truck when said lock is in place.

* * * * *